Patented Oct. 9, 1928.

1,687,050

UNITED STATES PATENT OFFICE.

SHOZO YAMAMOTO, OF OSAKA-FU, JAPAN.

PROCESS FOR PRODUCING LIPASE.

No Drawing. Application filed June 9, 1925, Serial No. 36,035, and in Japan August 16, 1924.

My invention relates to a process for producing lipase for use in decomposing oil and fat, and has for its object to obtain a more or less pure lipase from vegetable protein containing material such as the refuse from beans after the extraction of the oil therefrom or oil cake or the like, with high efficiency of production and at a low cost.

It has heretofore been impossible to obtain or prepare a pure lipase although lipase bearing material has been prepared from the residue separated by filtration from the product prepared by adding dilute acetic acid to castor bean refuse and then grinding the compound.

Diseases of the human stomach or intestines are seldom caused by eating rice, wheat of the like. A far larger number of these diseases are due to indigestion or apepsy resulting from oil or fat containing foods, as for example fish, meat, fowl or fried foods. Such indigestion can be avoided by the use of lipase which decomposes oil and fat. Moreover, both oil and fat have a superior nutritive or calorific value compared to all other kinds of foods, and the perfect digestion of oil or fat can be attained by the aid of lipase.

The recently discovered nutrient "vitamin A", can be absorbed by the stomach or intestines only when the oil or fat containing it is completely decomposed. The aforesaid residue containing lipase has been used for decomposing these oils and fats, but it is obvious that a completely effective action of lipase can only be obtained by use of the free or pure lipase such as is obtained by means of my invention.

According to my invention, refuse such as vegetable seeds, rich in oil or fat, is fermented at a temperature which causes propagation of "perisporia" which is rich in lipase. The ferment is then dissolved in water, the precipitate being removed from the solution and finally acetic acid is added to the said solution and the lipase precipitated.

For the purpose of a more complete understanding of my invention I will explain below a preferred practical process embodying my invention.

Castor bean refuse and soya bean refuse are mixed in vessel in a proportion of 1 to 20. The two kinds of refuse are mixed in order to obtain a higher speed of fermentation, and a better appearance of the product. The ratio of the mixing may be varied. It may be 1 to 5, 1 to 10, or 1 to 100, but the ratio above specified is the most suitable to obtain a high speed of fermentation and the best appearance of the product.

The materials are thoroughly mixed and then subjected to and maintained at a constant temperature, say 30° C. to 40° C., for a period of one week or so. At the end of the period the proteins in the soya bean refuse become a yeast-like substance by fermentation, which substance is immersed in water, agitated therein and then left for one or two hours. After this treatment the yeast-like substance dissolves and non-fermented substances precipitate. The solution thus obtained is then introduced into another vessel, and the lipase may be precipitated by adding a quantity of acetic acid or by evaporating the same at a low temperature.

Alternatively the lipase can be obtained by subjecting one part of castor bean refuse to a fermentation for five days, then adding twenty parts of soya bean refuse thereto and subjecting the mixture to fermentation for two or three days.

This process diminishes the volume of the chamber used for the fermentation or the fermentation chamber is utilized at a higher efficiency than in the former practice.

My experiments have shown that a product containing seven hundred times the amount of lipase originally contained in the material used can be obtained by this process.

Having now particularly described and ascertained the nature of my said invention and in what manner the same is to be performed, I declare that what I claim is:—

1. The process of producing lipase which comprises subjecting lipase yielding proteinaceous material rich in oil and fat to fermentation at about 30° C. to 40° C. until the protein material is converted into a yeast-like substance, immersing the material in water to dissolve the yeast-like substance, removing the undissolved material, and thereafter treating the solution with acetic acid to precipitate lipase.

2. The process as in claim 1 in which the proteinaceous material is castor bean refuse.

3. The process of producing lipase which comprises subjecting castor bean refuse to fermentation, adding soya bean refuse thereto and continuing the fermentation at about 30° C. to 40° C. until protein material in the refuse is converted into a yeast-like substance, immersing the material in water to dissolve the yeast-like substance, removing the undissolved material, and thereafter treating the solution with acetic acid to precipitate lipase.

In testimony whereof I affix my signature.

SHOZO YAMAMOTO.